US010279556B2

United States Patent
Imaeda et al.

(10) Patent No.: US 10,279,556 B2
(45) Date of Patent: May 7, 2019

(54) PRESS MACHINE AND PRESS METHOD

(71) Applicant: Murata Machinery, Ltd., Kyoto-shi, Kyoto (JP)

(72) Inventors: Wataru Imaeda, Inuyama (JP); Masaaki Hayashi, Inuyama (JP); Akinobu Watanabe, Inuyama (JP)

(73) Assignee: Murata Machinery, Ltd. (JP)

( * ) Notice: Subject to any disclaimer, the term of this patent is extended or adjusted under 35 U.S.C. 154(b) by 460 days.

(21) Appl. No.: 15/025,847

(22) PCT Filed: Aug. 20, 2014

(86) PCT No.: PCT/JP2014/071790
§ 371 (c)(1),
(2) Date: Mar. 29, 2016

(87) PCT Pub. No.: WO2015/049930
PCT Pub. Date: Apr. 9, 2015

(65) Prior Publication Data
US 2016/0243778 A1    Aug. 25, 2016

(30) Foreign Application Priority Data
Oct. 2, 2013 (JP) ................................ 2013-207057

(51) Int. Cl.
*B30B 1/18* (2006.01)
*B29C 43/04* (2006.01)
(Continued)

(52) U.S. Cl.
CPC .................. *B30B 1/18* (2013.01); *B21D 5/02* (2013.01); *B30B 1/186* (2013.01); *B30B 15/026* (2013.01);
(Continued)

(58) Field of Classification Search
CPC ....... B29C 43/04; B29C 43/006; B29C 43/02; B30B 1/18
See application file for complete search history.

(56) References Cited

U.S. PATENT DOCUMENTS 5,770,128 A * 6/1998 Kobayashi .............. B29C 33/72
264/272.17
7,175,405 B2 * 2/2007 Kobayashi .............. B29C 33/68
425/116

(Continued)

FOREIGN PATENT DOCUMENTS

JP            3953414 B2    5/2007

*Primary Examiner* — Joseph S Del Sole
*Assistant Examiner* — Thu Khanh T Nguyen
(74) *Attorney, Agent, or Firm* — DLA Piper LLP (US)

(57) ABSTRACT

A press machine includes a drive mechanism that moves at least one of an upper tool and a lower tool and machines a workpiece placed between the upper and lower tools. The drive mechanism includes a first drive source that rotates a screw shaft serving as an advance-retract component and a second drive source that rotates a nut connected to the screw shaft. A structure including the upper tool and lower tools includes a casing supporting the screw shaft such that the screw shaft is rotatable, a movable member that is movably formed in the casing and can contact an end of the screw shaft or retract therefrom, and a drive unit that moves the movable member.

7 Claims, 9 Drawing Sheets

(51) Int. Cl.
*B21D 5/02* (2006.01)
*F16H 25/20* (2006.01)
*B30B 15/02* (2006.01)
*B30B 15/06* (2006.01)

(52) U.S. Cl.
CPC .......... *B30B 15/028* (2013.01); *B30B 15/068* (2013.01); *F16H 25/2018* (2013.01); *F16H 25/20* (2013.01)

(56) References Cited

U.S. PATENT DOCUMENTS

| | | | |
|---|---|---|---|
| 7,284,407 B2 * | 10/2007 | Imaeda | B30B 1/18 100/289 |
| 9,138,794 B2 * | 9/2015 | Imaeda | B30B 1/23 |
| 2005/0204798 A1 | 9/2005 | Imaeda | |

* cited by examiner (a)

(b)

(a)

(b)

(a)

(b)

PRESS MACHINE AND PRESS METHOD

CROSS REFERENCE TO RELATED APPLICATIONS

This application is a national stage of international application no. PCT/JP2014/071790, filed on Aug. 20, 2014, and claims the benefit of priority under 35 USC 119 of Japanese application no. 2013-207057, filed on Oct. 2, 2013, which are incorporated herein by reference.

TECHNICAL FIELD

The present invention relates to a press machine and press method.

BACKGROUND ART

Press machines have been proposed that move an upper tool using a vertically moving screw shaft and nut (for example, see Patent Literature 1). In a press machine disclosed in Patent Literature 1, a screw shaft is connected to a first transmission that produces low torque at high speed, and a nut is connected to a second transmission that produces high torque at low speed. The screw shaft is connected to a ram including a holder supporting the upper tool through a co-rotation prevention mechanism. In approaching a workpiece, the press machine regulates the rotation of the nut member and activates the first transmission. Thus, it lowers the ram (upper tool) to a predetermined position at high speed and low torque while rotating the screw shaft. In bending the workpiece, the press machine regulates the rotation of the screw shaft using the co-rotation prevention mechanism and activates the second transmission. Thus, it rotates the nut member to lower the screw shaft at low speed and high torque to move the upper tool to the bottom dead center. It then sandwiches the workpiece between the upper tool and a lower tool and bends the workpiece.

CITATION LIST

Patent Literature

[Patent Literature 1] Japanese Patent No. 3953414

DISCLOSURE OF THE INVENTION

Technical Problem

The press machine disclosed in Patent Literature 1 prevents the co-rotation of the screw shaft using the co-rotation prevention mechanism during bending. During an approach or return, this co-rotation prevention mechanism forms a gap between the end of the screw shaft and the ram by the self-weight of the ram including the upper tool and allows the rotation of the screw shaft. During bending, on the other hand, the co-rotation prevention mechanism causes the end of the screw shaft and the ram to contact each other on the basis of pressure applied to the workpiece and prevents the co-rotation of the screw shaft associated with the rotation of the nut member by the friction braking force between both.

However, the bottom dead center position of the upper tool varies, for example, between when the workpiece is bent using the load of the ram and when the workpiece is bent by pressing down the ram using the screw shaft, since this co-rotation prevention mechanism forms a gap between the end of the screw shaft and the ram. Thus, the co-rotation prevention mechanism has a problem that if the load required to bend the workpiece is close to the weight of the ram, the bottom dead center position of the upper tool varies, making it difficult to bend the workpiece as scheduled.

Further, this co-rotation prevention mechanism prevents the co-rotation of the screw shaft by causing the end of the screw shaft to contact the ram. Thus, it has a problem that when the workpiece is bent by the self-weight of the ram, the gap between the screw shaft and the ram remains and therefore the co-rotation of the screw shaft cannot be prevented even when the nut member is rotated. A conceivable solution of this problem is to lift the ram to cause the ram to contact the screw shaft. However, if the ram has a large self-weight, the press machine would require a high-output hydraulic mechanism or the like, making downsizing difficult.

In view of the foregoing, an object of the present invention is to provide a press machine and press method that can achieve the prevention of the co-rotation of a screw shaft and the stabilization of the bottom dead center position of an upper tool by easily eliminating a gap formed between a ram and the screw shaft.

Solution to Problem

To achieve the above object, the present invention provides a press machine including a drive mechanism configured to move at least one of an upper tool and a lower tool, the press machine aiming to machine a workpiece placed between the upper tool and the lower tool. The drive mechanism uses a screw shaft or a nut connected to the screw shaft as an advance-retract component and includes a first drive source configured to rotate the screw shaft and a second drive source configured to rotate the nut. A structure including the upper tool or the lower tool includes a casing supporting the screw shaft or the nut in such a manner that the screw shaft or the nut is rotatable, a movable member movably formed in the casing and configured to be capable of contacting an end of the screw shaft or an end of the nut or retracting therefrom, and a drive unit configured to move the movable member.

The end of the screw shaft or the end of the nut may have an inclined surface inclined with respect to an advance-retract direction, and the movable member may have an inclined surface that can contact the inclined surface. A slide screw nut formed in the casing and connected to a slide screw may be used as the movable member. When the slide screw nut is rotated by the drive unit, the slide screw nut may contact the end of the screw shaft or the end of the nut or retract therefrom. The slide screw may be formed along a shaft core of the screw shaft in the casing. When the slide screw nut is rotated, the slide screw nut may move in the same direction as the advance-retract direction of the screw shaft or the nut.

A piezoelectric element disposed between the casing and the movable member may be used as the drive unit. When the piezoelectric element shrinks, the movable member may contact the end of the screw shaft or the end of the nut or retract therefrom. A structure including the upper tool may include an upper tool holder holding the upper tool and a ram on which the upper tool holder is mounted, and the casing may be formed on an upper portion of the ram and may connect the screw shaft or the nut and the ram.

The present invention also provides a press method including a drive mechanism configured to move at least one of an upper tool and a lower tool, the press method aiming to machine a workpiece placed between the upper tool and the lower tool. The drive mechanism uses a screw shaft or a nut connected to the screw shaft as an advance-retract component and includes a first drive source configured to rotate the screw shaft and a second drive source configured to rotate the nut. A structure including the upper tool or the lower tool includes a casing supporting the screw shaft or the nut in such a manner that the screw shaft or the nut is rotatable, a movable member movably formed in the casing and configured to be capable of contacting an end of the screw shaft or an end of the nut or retracting therefrom, and a drive unit configured to move the movable member. The press method includes rotating, by the first drive source or the second drive source, the screw shaft or the nut with the movable member retracted from the end of the screw shaft or the end of the nut to move at least one of the upper tool or the lower tool, subsequently causing, by the drive unit, the movable member to contact the end of the screw shaft or the end of the nut, and subsequently rotating, by the second drive source or the first drive source, the nut or the screw shaft to machine the workpiece.

Advantageous Effects of the Invention

According to the present invention, when machining the workpiece, the drive unit causes the movable member to contact the end of the screw shaft or the nut (hereafter referred to as "the screw shaft or the like"). Thus, the co-rotation of the screw shaft or the like is prevented easily and reliably. Further, the gap between the end of the screw shaft or the like and the ram is eliminated by the movable member. Thus, even when the workpiece is machined using a load similar to self-weight of the ram, it is possible to stabilize the bottom dead center position of the upper tool and thus to reliably machine the workpiece as scheduled.

Further, if the end of the screw shaft or the like has an inclined surface inclined with respect to an advance-retract direction and the movable member has an inclined surface that can contact the inclined surface, the movable member and the end of the screw shaft or the like can reliably contact each other by a large friction resulting from an inclined wedge, compared to when the flat surfaces contact each other. Thus, the co-rotation of the screw shaft or the like can be reliably prevented. Further, if a slide screw nut formed in the casing and connected to the slide screw is used as the movable member and if, when the slide screw nut is rotated by the drive unit, the slide screw nut contacts the end of the screw shaft or the end of the nut or retracts therefrom, the slide screw nut can be prevented from inadvertently rotating when the slide screw nut receives a load from the screw shaft or the like. Further, if the slide screw is formed along a shaft core of the screw shaft in the casing and if, when the slide screw nut is rotated, the slide screw nut moves in the same direction as the advance-retract direction of the screw shaft or the like, the gap formed between the end of the screw shaft or the like and the ram can be reliably eliminated.

Further, if a piezoelectric element disposed between the casing and the movable member is used as the drive unit and if, when the piezoelectric element shrinks, the movable member contacts the end of the screw shaft or the end of the nut or retracts therefrom, it is possible to cause the movable member to electrically advance or retract, unlike when a mechanical screw is used. Further, if a structure including the upper tool includes an upper tool holder holding the upper tool and a ram on which the upper tool holder is mounted and if the casing is formed on an upper portion of the ram and connects the screw shaft or the like and the ram, a gap between the screw shaft or the like and the ram formed by the self-weight of the ram, upper tool holder, or the like can be reliably eliminated using the movable member.

According to the press method of the present invention, the gap between the end of the screw shaft or the like and a ram is eliminated using the movable member, and the bottom dead center position of the upper tool is stabilized. Thus, it is possible to reliably machine the workpiece and thus to suppress the occurrence of defective products to improve production efficiency.

BRIEF DESCRIPTION OF THE DRAWINGS

FIG. 4 includes diagrams showing a main part of the press machine, in which FIG. 4(a) is a sectional view during an approach and FIG. 4(b) is an enlarged view of inclined surfaces and vicinities thereof.

FIG. 5 includes diagrams showing a main part of the press machine, in which FIG. 5(a) is a sectional view during bending and FIG. 5(b) is an enlarged view of the inclined surfaces and vicinities thereof.

FIG. 7 includes diagrams showing a main part of a press machine according to a second embodiment, in which FIG. 7(a) is a sectional view during an approach and FIG. 7(b) is a sectional view during bending.

FIG. 8 includes diagrams showing a main part of a press machine according to a third embodiment, in which FIG. 8(a) is a sectional view during an approach (or during a return) and FIG. 8(b) is an enlarged view of inclined surfaces and vicinities thereof.

FIG. 9 includes diagrams showing a main part of the press machine, in which FIG. 9(a) is a sectional view during bending and FIG. 9(b) is an enlarged view of the inclined surfaces and vicinities thereof.

DESCRIPTION OF EMBODIMENTS

Figure 1:
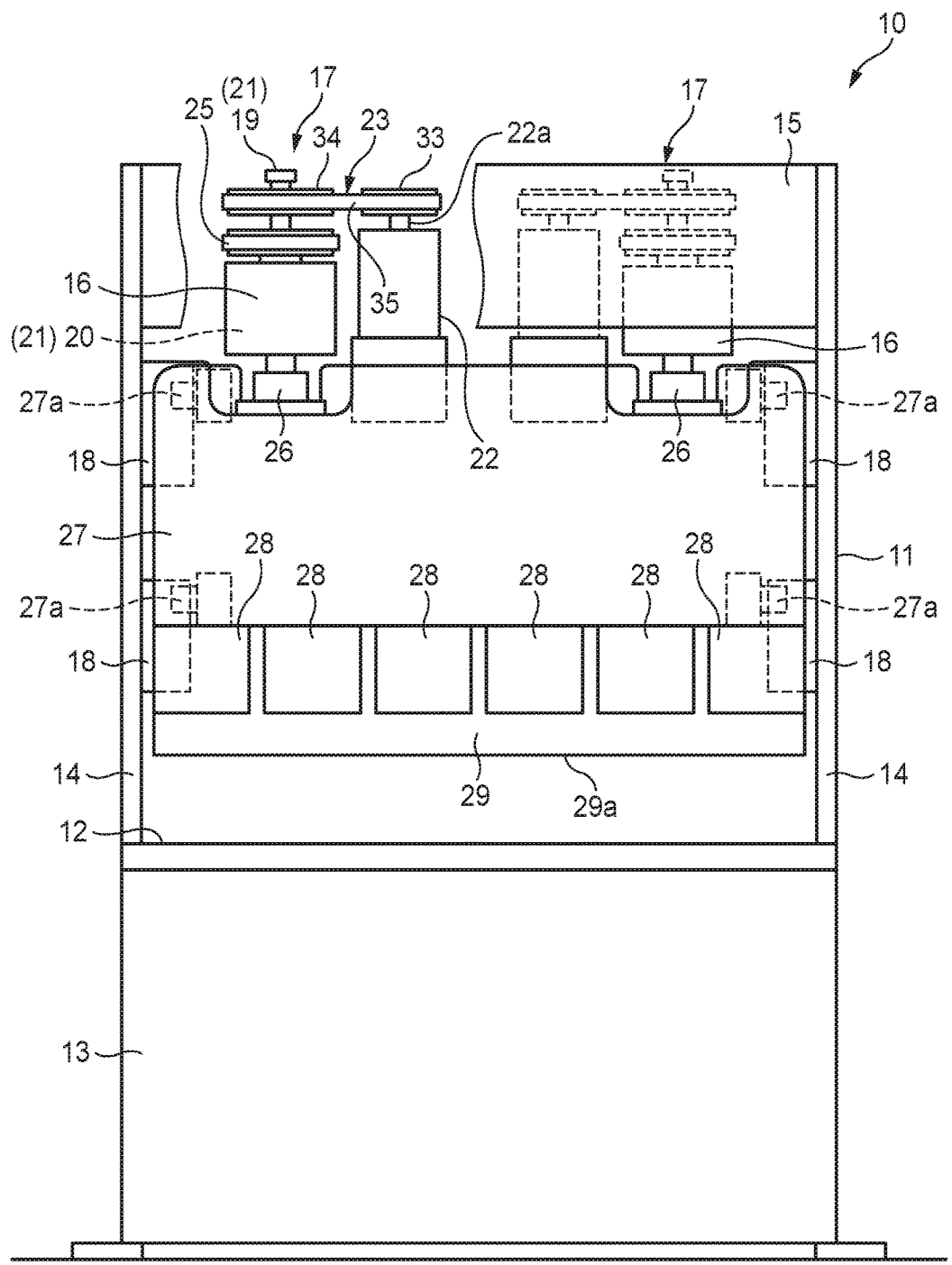
FIG. 1 is a front view showing an example of a press machine according to a first embodiment.

Now, embodiments of the present invention will be described with reference to the drawings. However, the present invention is not limited to the embodiments described below. To clarify the embodiments, some or all of the drawings are schematically shown. Further, the drawings are scaled as appropriate, for example, partially enlarged or highlighted. The left side, right side, front side, and back side in the embodiments are defined as the left side, right side, front side, and back side, respectively, of FIG. 1 showing a front view of a press machine 10. Accordingly, the horizontal direction in FIG. 1 is the horizontal direction of the press machine 10, and the vertical direction in FIG. 1 is the front-back direction of the press machine 10.

First Embodiment

Figure 2:
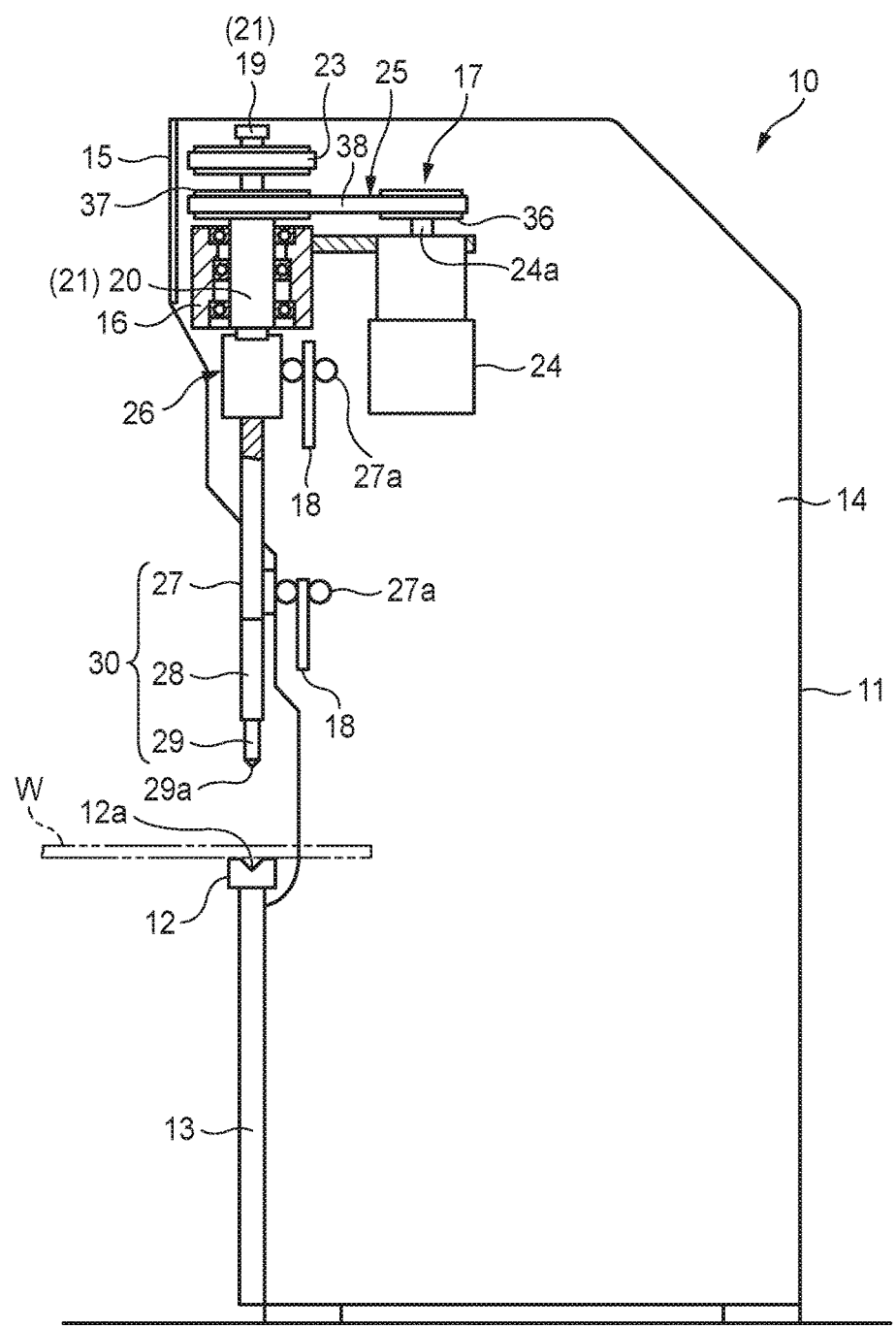
FIG. 2 is a partial cutaway right side view of the press machine.

A press machine of a first embodiment will be described with reference to FIGS. 1 to 5. FIG. 1 is a front view of the press machine 10. FIG. 2 is a partial cutaway right side view of the press machine 10. As shown in FIGS. 1 and 2, the press machine 10 of the present embodiment is a press brake and includes a body frame 11, a table 13 supporting a lower tool 12, and a pair of side plates 14. The body frame 11 forms the outline of the press machine 10.

The lower tool 12 is a fixed die and is formed so as to be horizontally long. As shown in FIG. 2, the lower tool 12 has a recess 12a for molding. The table 13 is installed on the front side of the body frame 11 and fixes the lower tool 12. The side plates 14 are mounted on the left and right sides of the body frame 11. Each side plate 14 has inwardly protruding guide plates 18 in two vertical locations thereof. An upper cover plate 15 is mounted between the pair of side plates 14.

The press machine 10 includes multiple drive mechanisms 17. The drive mechanisms 17 are arranged behind the upper cover plate 15 of the body frame 11. Each drive mechanism 17 is mounted on the body frame 11 using a mounting mechanism (not shown). Each drive mechanism 17 includes a ball screw 21 including a screw shaft 19 and a nut 20, a first drive source 22, a first transmission 23, a second drive source 24, a second transmission 25, and a junction 26.

The screw shaft 19 is an advance/retract component. It is disposed in the vertical direction of the body frame 11 and rotatably supported by the body frame 11. The length of the screw shaft 19 is set in accordance with the movement range of the upper tool 29. A ram 27 is mounted over a lower portion of the screw shaft 19 with a junction 26 having a screw shaft 19 co-rotation prevention function therebetween. The junction 26 will be described later. The ram 27 is a tabular member formed of a metal or the like and has a weight of, for example, several tens to several hundred kg. The ram 27 has rollers 27a sandwiching guide plates 18 formed thereon. The rollers 27a are guided by the guide plates 18 and thus the ram 27 is vertically guided.

Multiple upper tool holders 28 are horizontally mounted on a lower portion of the ram 27 at predetermined intervals. Each upper tool holder 28 includes a clamp mechanism for sandwiching and holding the upper tool 29. Note that the ram 27 and upper tool holders 28 need not have the configurations shown in the figures and may have any configuration. When the upper tool 29 is held by the upper tool holders 28, it is disposed so as to be opposite to the recess 12a of the lower tool 12. The upper tool 29 has an end 29a that enters the recess 12a of the lower tool 12. The ram 27, upper tool holders 28, and upper tool 29 integrally form a vertically moving structure 30 (see FIG. 2).

The screw shaft 19 is screwed into the nut 20. The nut is rotatably held by multiple bearings (e.g., ball bearings, roller bearings) of a bearing 16 formed in the body frame 11. The vertical movement of the nut 20 is regulated by the bearing 16. Thus, when the screw shaft 19 is rotated with the rotation of the nut 20 regulated, the screw shaft 19 can be moved vertically. Also, when the nut 20 is rotated with the rotation of the screw shaft 19 regulated, the screw shaft 19 can be moved vertically.

The first drive source 22 is, for example, a servo motor. In the present embodiment, the first drive source 22 is a low-torque, high-speed-rotation servo motor. An output shaft 22a of the first drive source 22 is connected to the input side of the first transmission 23. The first drive source 22 is supported by the body frame 11 so as to be vertically movable along a guide mechanism (not shown) in conjunction with the movement of the screw shaft 19. The first drive source 22 rotationally drives the output shaft 22a in accordance with a command from a controller (not shown).

As with the first drive source 22, the second drive source 24 is, for example, a servo motor. In the present embodiment, the second drive source 24 is a high-torque, low-speed-rotation servo motor. An output shaft 24a of the second drive source 24 is connected to the input side of the second transmission 25. The second drive source 24 is fixed to the body frame 11 by a fixing mechanism (not shown). As with the first drive source 22, the second drive source 24 rotationally drives the output shaft 24a in accordance with a command from a controller (not shown).

Figure 3:
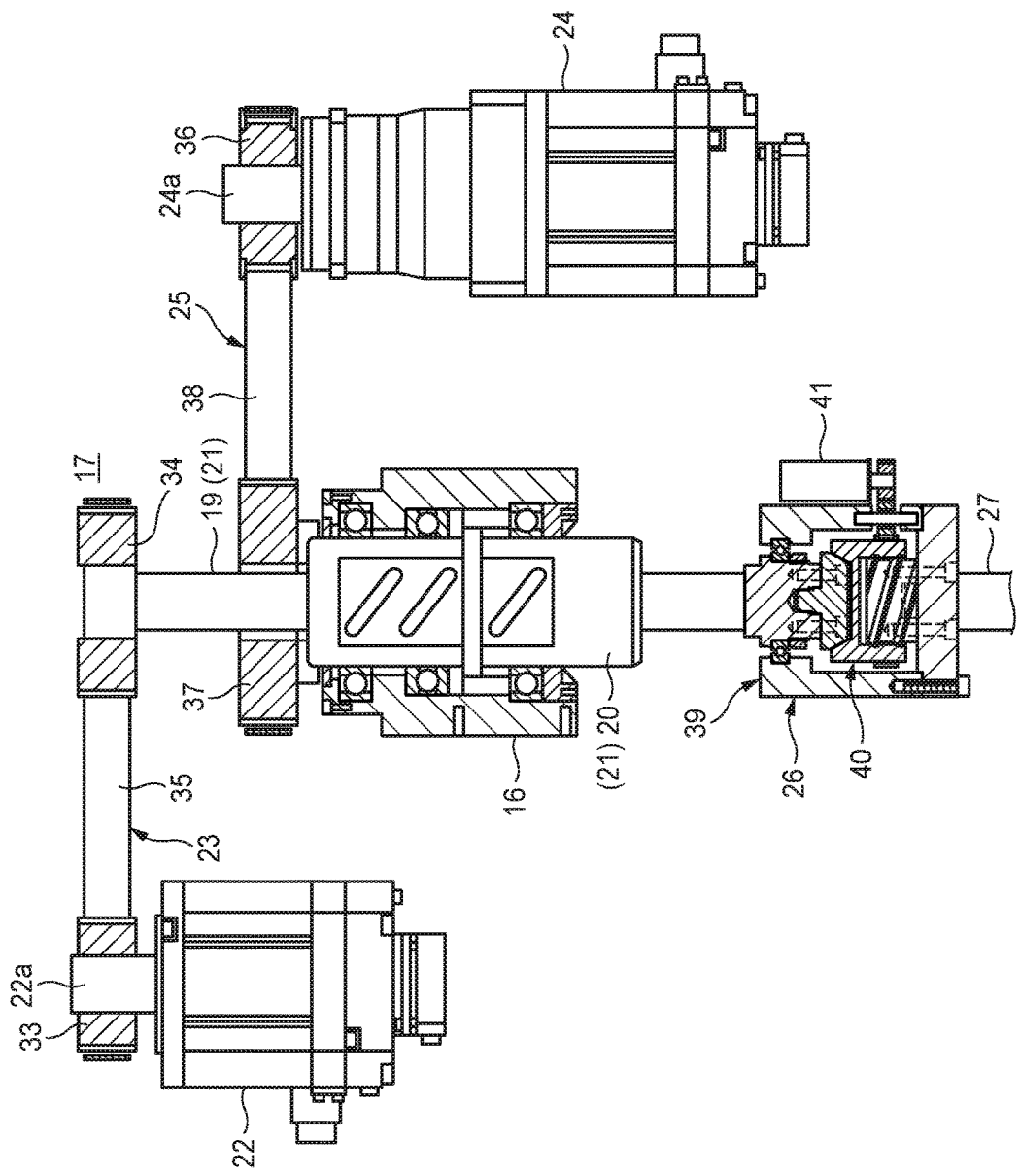
FIG. 3 is a developed view showing a drive mechanism of the press machine.

FIG. 3 is a developed view showing a drive mechanism 17 of the press machine 10. FIG. 3 shows the first drive source 22 and second drive source 24 together. As shown in FIG. 3, a first transmission 23 includes a driving pulley 33, a driven pulley 34, and a belt 35. The driving pulley 33 is coaxially mounted on the output shaft 22a of the first drive source 22. The driven pulley 34 is coaxially mounted on the upper end of the screw shaft 19. The belt 35 is hung on the driving pulley 33 and driven pulley 34. Thus, when the first drive source 22 is driven, the screw shaft 19 is rotated at high speed and low torque through the first transmission 23. As a result, the screw shaft 19 moves vertically at high speed. Note that the first drive source 22 is driven when the upper tool 29 approaches a workpiece or when it returns.

The second transmission 25 includes a driving pulley 36, a driven pulley 37, and a belt 38. The driving pulley 36 is coaxially mounted on the output shaft 24a of the second drive source 24. The driven pulley 37 is coaxially mounted on the upper end of the nut 20. The belt 38 is hung on the driving pulley 36 and driven pulley 37. Thus, when the second drive source 24 is driven, the nut 20 is rotated at low speed and high torque through the second transmission 25. Due to the rotation of the nut 20, the screw shaft 19 is moved at low speed in a screwed manner.

While, in the present embodiment, the first transmission and second transmission 25 of the drive mechanism 17 include the driving pulleys 33, 36, driven pulleys 34, 37, and belts 35, 38, respectively, these transmissions may transmit the driving force, for example, using gear trains. While, in the present embodiment, the two drive mechanisms 17 are disposed with respect to the single ram 27, one or three or more drive mechanisms 17 may be disposed.

Figure 4:
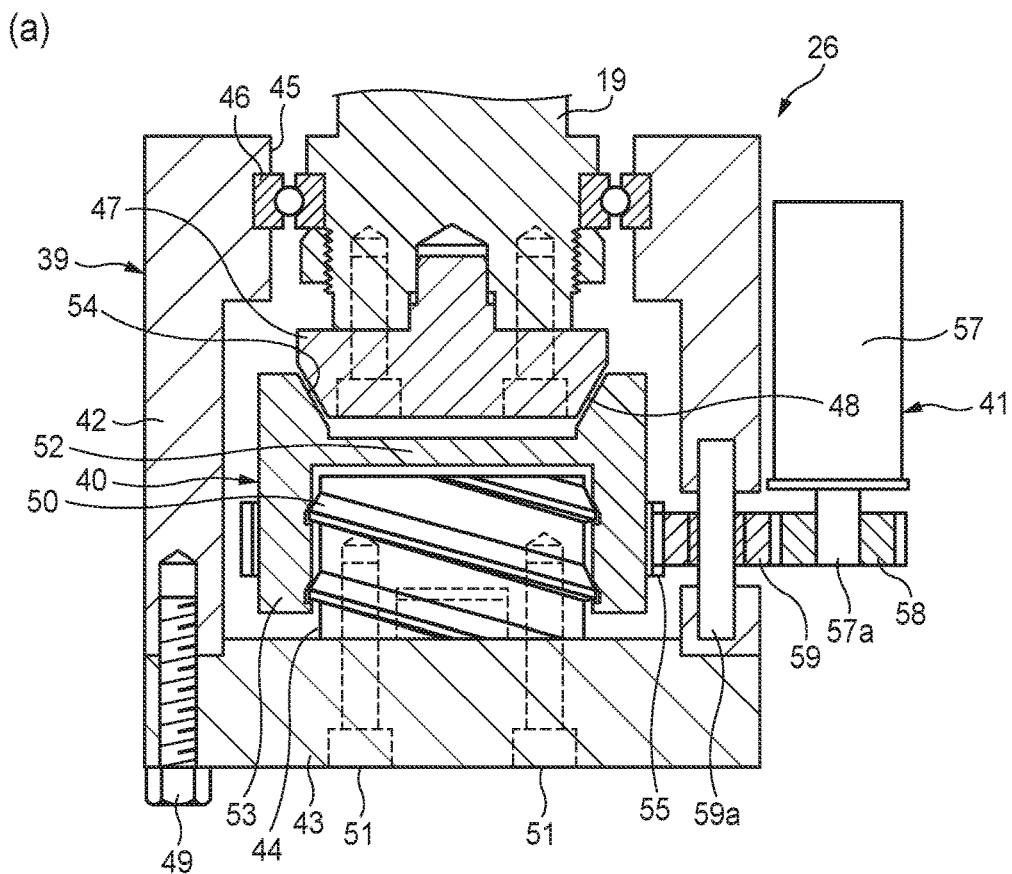
Figure 4:
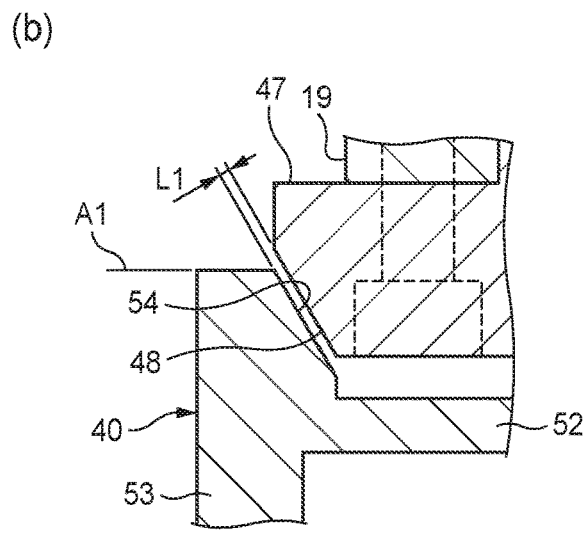

FIG. 4 includes diagrams showing the junction 26 of the press machine 10, in which FIG. 4(a) is a sectional view showing the state during an approach (or during a return) and FIG. 4(b) is a sectional view showing an enlarged main part. As shown in FIG. 4(a), the junction 26 includes a casing 39, a movable member 40, and a drive unit 41.

The casing 39 includes a tube 42, a bottom plate 43, and a slide screw 44. The casing 39 connects the screw shaft 19 and ram 27. The tube 42 has an opening 45 at the upper end thereof and supports the lower end of the screw shaft 19 with a ball bearing 46 mounted on the opening 45 therebetween in such a manner that the lower end of the screw shaft 19 is rotatable. The lower side surface of the screw shaft 19 is fixed with the inner ring of the ball bearing 46 sandwiched between the casing 39 and screw shaft 19. Thus, the vertical relative movement of the casing 39 and screw shaft 19 is regulated. A contact member 47 is mounted on the lower end of the screw shaft 19 using bolts or the like. The contact member 47 has a lower surface having a convex truncated conical shape and also has an inclined surface 48 around the lower surface.

The bottom plate 43 is fixed to the bottom of the tube 42 using a bolt 49. The bottom plate 43 is formed on the upper edge of the ram 27 (see FIG. 3). The slide screw 44 has a slide screw 50 on the perimeter thereof and is fixed to the upper surface (in the casing 39) of the bottom plate 43 using bolts 51. The slide screw 44 is disposed as to be spaced from the contact member 47 of the screw shaft 19 and along the rotation axis of the screw shaft 19.

A slide screw nut 53 having a top plate 52 is used as the movable member 40. The slide screw 44 is screwed into the slide screw nut 53. The top plate 52 has an inclined surface 54 that can contact the inclined surface 48 of the contact member 47 of the screw shaft 19. The slide screw nut 53 has a gear 55 on the entire perimeter thereof. When the slide screw nut 53 rotates, it moves in the direction of the rotation axis (vertical direction) of the screw shaft 19. Thus, the slide screw nut 53 makes a transition from a state in which the inclined surface 54 is in contact with the inclined surface 48 of the contact member 47 (see FIG. 5 to be discussed later) to a retract state in which a gap L1 is formed between the inclined surface 54 and inclined surface 48, as shown in FIG. 4(b), and vice versa.

The drive unit 41 includes a drive source 57, a drive gear 58, and an intermediate gear 59. The drive source 57 is, for example, a servo motor. The drive gear 58 is coaxially mounted on an output shaft 57a of the drive source 57. The intermediate gear 59 is rotatably supported by a shaft 59a formed on the tube 42 of the casing 39. The intermediate gear 59 is disposed so as to be engaged with the drive gear 58, as well as engaged with the gear 55 of the slide screw nut 53. The drive unit 41 rotates the output shaft 57a of the drive source 57 on the basis of a command from a controller (not shown). By rotating the drive gear 58, the slide screw nut 53 is rotated through the intermediate gear 59.

Figure 5:
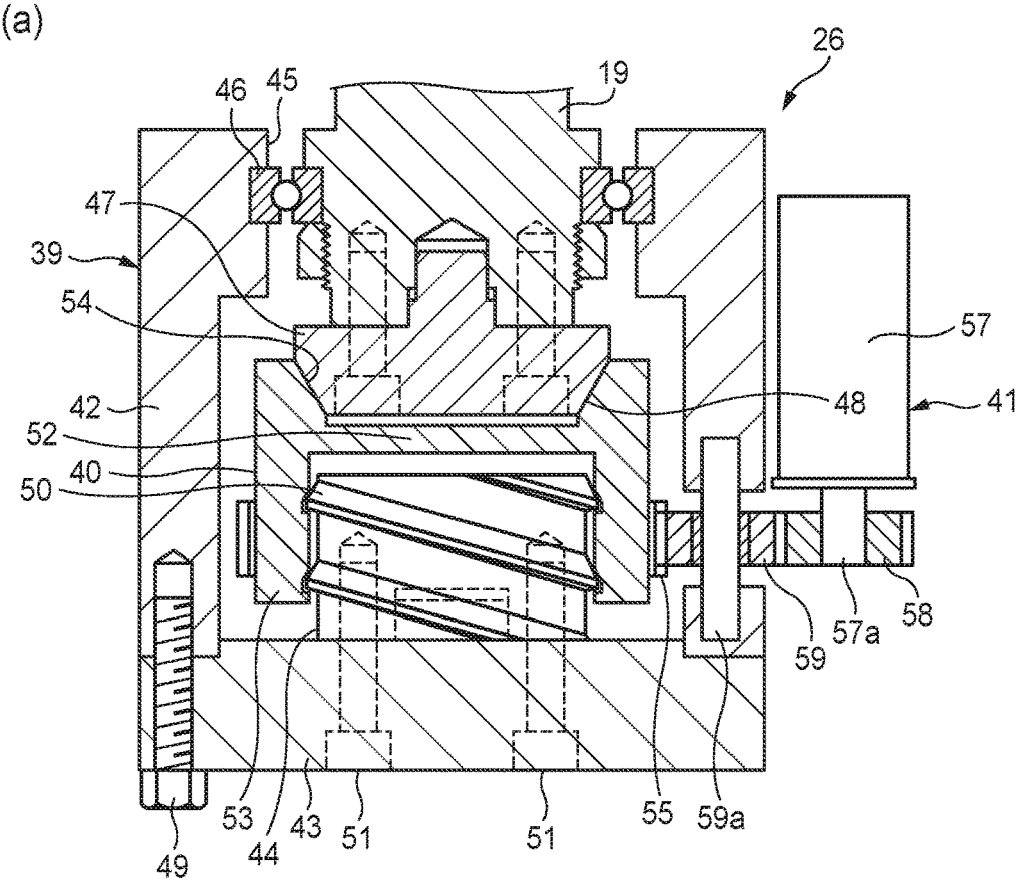
Figure 5:
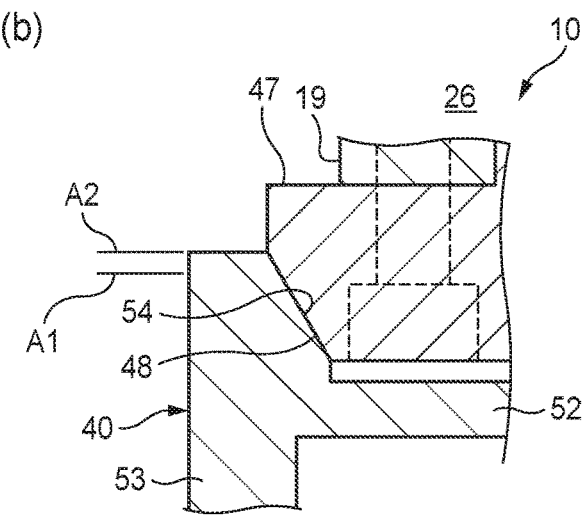

FIG. 5 includes diagrams showing a main part of the press machine 10, in which FIG. 5(a) is a sectional view showing the state during bending and FIG. 5(b) is an enlarged sectional view showing the main part. As shown in FIG. 5(a), when the drive unit 41 is driven to raise the slide screw nut 53, the inclined surface 48 of the contact member 47 and the inclined surface 54 of the slide screw nut 53 contact each other. At this time, the upward movement of the screw shaft 19 is regulated by the ball bearing 46 and therefore the slide screw nut 53 can be strongly pressed against the contact member 47. Thus, the inclined surface 54 strongly contacts the inclined surface 48. Owing to a wedge effect, a friction can be generated that regulates the rotation of the contact member 47 (screw shaft 19). The inclination angle of the inclined surface 48 and inclined surface 54 (the inclination angle with respect to the rotation axis of the screw shaft 19) can be set to any angle.

Similarly, the inclined surfaces of the threads of the slide screw 50 and slide screw nut 53 are in contact with each other. Thus, when the slide screw nut 53 receives a force in the axial direction (vertical direction), a friction is generated between both due to a wedge effect, and inadvertent rotation of the slide screw nut 53 is prevented. The inclined angle of the threads of the slide screw 44 and slide screw nut 53 can be set to any angle.

The pitch or the like of the slide screw 50 or the like can be set to any size. While a gear train is used to transmit the driving force of the drive unit 41, other means may be used. For example, a belt may be used to transmit the driving force. Or, the slide screw nut 53 may be rotated by using a pinion gear as the gear 55 on the perimeter of the slide screw nut 53 and causing a rack engaged with the pinion gear to linearly move. Instead of the servo motor, a hydraulic or pneumatic drive source may be used to rotate the slide screw nut 53. The inclined surface 48 of the contact member 47 and the inclined surface 54 of the slide screw nut may have any configuration. Both may be mirror-finished, or one or both may be roughened to increase the friction. These descriptions about the contact surfaces also apply to second and third embodiments below.

While, in the present embodiment, the movable member 40 moves along the rotation axis of the screw shaft 19, the movable member 40 may move in other manners. For example, the movable member 40 shifted from the rotation axis of the screw shaft 19 may move in parallel with the rotation axis, or the movable member 40 may move in a direction inclined with respect to or perpendicular to the rotation axis. In any case, the moving direction of the movable member 40 may be set to any direction as long as a wobble caused by the gap between the end of the screw shaft 19 and the ram 27 is eliminated and the co-rotation of the screw shaft 19 is prevented.

Figure 6:
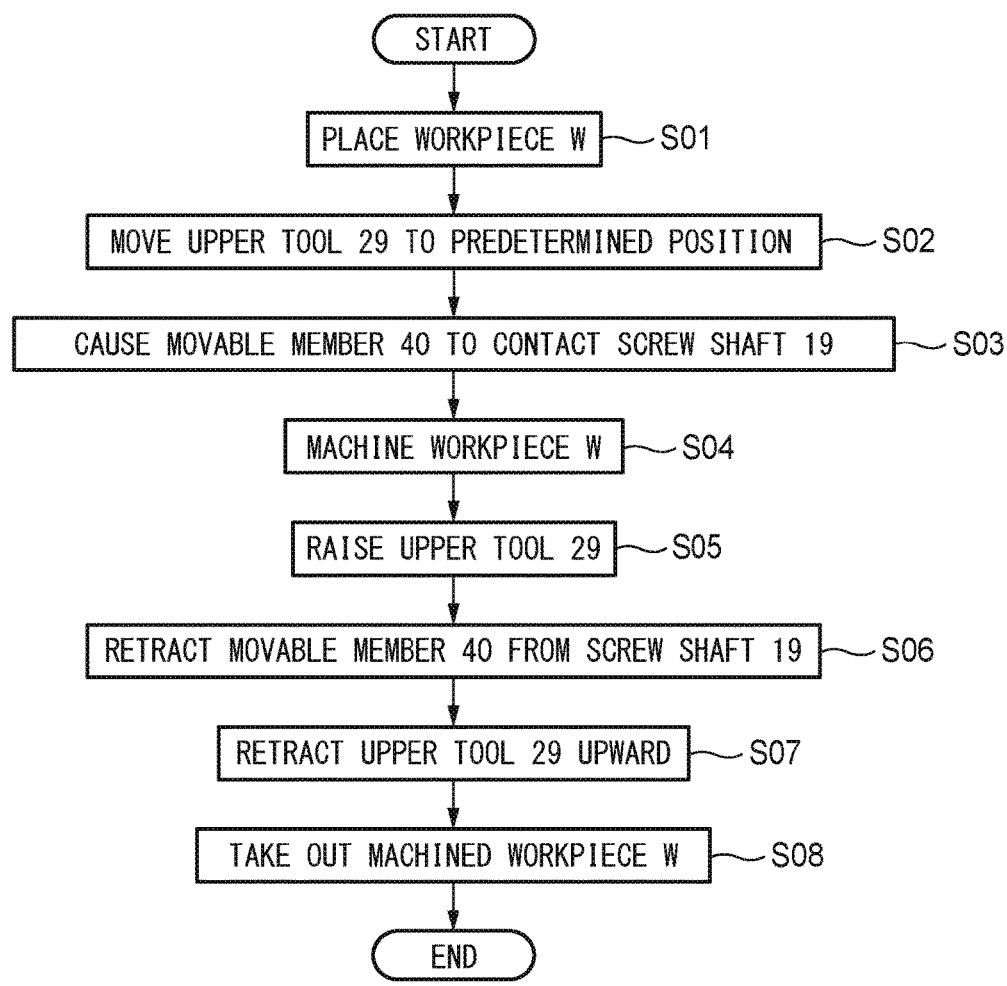
FIG. 6 is a flowchart showing an example of a press method according to an embodiment.

Next, a press method using the press machine 10 will be described with reference to FIG. 6. First, as shown in FIG. 6, a workpiece W is placed on the lower tool 12 with the upper tool 29 retracted above (see FIG. 2; step S01). The press machine 10 includes a workpiece positioning mechanism (not shown). The operator positions the workpiece W on the lower tool 12 by butting an end of the workpiece W against the positioning mechanism.

Then, the upper tool 29 (ram 27) is lowered to a predetermined position (step S02). In this approach step, as shown in FIG. 3, by driving the first drive source 22, the screw shaft 19 is rotated at high speed through the first transmission 23. At this time, as shown in FIG. 4, the movable member 40 of the junction 26 is retracted at a position A1, and a gap L1 is formed between the contact member 47 and slide screw nut 53. Accordingly, the screw shaft 19 can be rotated freely, and when the screw shaft 19 is rotated at high speed and lowered, the ram 27 and upper tool 29 can be lowered to the predetermined position. While, in step S02, the screw shaft 19 is rotated by the first drive source 22, the nut 20 may be also rotated by driving the second drive source 24.

Then, by driving the drive unit 41 of the junction 26, the slide screw nut 53 is rotated. Thus, as shown in FIG. 5(b), the slide screw nut 53 is raised to a position A2 and thus contacts the contact member 47 (screw shaft 19) (step S03). As shown in FIG. 5, the drive of the drive unit 41 is stopped with the inclined surface 54 of the slide screw nut 53 strongly pressed against the inclined surface 48 of the contact member 47. Thus, the rotation of the screw shaft 19 is regulated by the slide screw nut 53. While the drive unit is driven after the screw shaft 19 is lowered to a predetermined position by driving the first drive source 22 (after step S02), it may be driven at other timings. For example, the drive unit 41 may be driven during the descent of the screw shaft 19 to the predetermined position (during step S02).

Then, by driving the second drive source 24, the nut 20 is rotated. Thus, the screw shaft 19 is lowered, so that the upper tool 29 is moved to the bottom dead center. At this time, the workpiece W is sandwiched between the upper tool 29 and lower tool 12 and thus the workpiece W is bent (step S04). As described above, the rotation of the screw shaft 19 is regulated by the slide screw nut 53. Thus, even when the nut is rotated, the co-rotation of the screw shaft 19 is prevented. Further, during bending, the force pressing the inclined surface 54 against the inclined surface 48 is increased by the counterforce from the workpiece W. Thus, the co-rotation of the screw shaft 19 is prevented. Since the inclined surfaces are used on the threads of the slide screw 44 and slide screw nut 53, inadvertent rotation of the slide screw nut 53 is prevented due to a wedge effect even when the slide screw nut 53 is strongly pressed by the screw shaft 19 during bending.

There is a case in which the workpiece W need not be bent by pressing down the ram 27 using the screw shaft 19, but rather is bent using the self-weight of the ram 27 or the like. Even in this case, particularly, even when the load required to bend the workpiece W is close to the weight of the ram 27, the bottom dead center position of the upper tool 29 does not vary, since the gap between the screw shaft 19 and ram 27 is filled with the slide screw nut 53. Accordingly, the upper tool 29 can be reliably moved to the predetermined bottom dead center position. The driving timing, the amount of drive, and the like of the first drive source 22, second drive source 24, and drive unit 41 are controlled by a controller (not shown).

After bending the workpiece W, the upper tool 29 is retracted to the original position (see FIG. 2) in accordance with a procedure reverse to that described above and then the bent workpiece W is taken out. Specifically, first, by driving the second drive source 24, the nut 20 is rotated backward and thus the screw shaft 19 is raised (step S05). Then, by driving the drive unit 41, the slide screw nut 53 is rotated backward and thus lowered. As a result, the slide screw nut 53 is retracted from the contact member 47 (step S06). Then, by driving the first drive source 22, the screw shaft 19 is rotated backward and thus the screw shaft 19 is raised (step S07). Note that the method of retracting the upper tool 29 described above is illustrative only. For example, the following method which does not use the second drive source 24 may be used: first, as described in step S06, by driving the drive unit 41, the slide screw nut 53 is retracted from the contact member 47; and then, as described in step S07, by driving the first drive source 22, the screw shaft 19 is rotated and thus raised.

As seen above, the press machine 10 according to the present embodiment causes the movable member 40 to contact or retract from the screw shaft 19 and thus can prevent the co-rotation of the screw shaft 19 easily and reliably. Further, the bottom dead center position of the upper tool 29 does not vary between when the workpiece W is bent using the load of the ram 27 and when the workpiece W is bent by pressing down the ram 27 using the screw shaft 19. Accordingly, for example, even when the load required to bend the workpiece W is close to the weight of the ram 27, the bottom dead center position of the upper tool 29 does not vary and thus the workpiece W can be bent reliably as scheduled.

Further, the inclined surfaces 48 and 54 are used as the contact portions of the screw shaft 19 and movable member 40. Accordingly, by strongly pressing both against each other, a strong friction can be generated due to a wedge effect and thus the rotation of the screw shaft 19 can be efficiently prevented. The inclined surfaces need not necessarily be used as the contact portions of the screw shaft 19 and movable member 40, and, for example, the flat portions of both may be caused to contact each other.

Further, the slide screw nut 53 is used as the movable member 40, and the inclined surface of the thread thereof is strongly pressed. Thus, as described above, inadvertent rotation can be regulated owing to a wedge effect. The slide screw nut 53 as described above need not necessarily be used, and a nut having a typical thread may be used. In this case, the nut may be provided with a lock mechanism or the like for preventing the inadvertent rotation of the nut. Further, the slide screw nut 53 is moved in the same direction as the advance-retract direction of the screw shaft 19. Thus, the gap formed between the screw shaft 19 and ram 27 can be reliably eliminated by performing an easy operation, such as rotating of the slide screw nut 53.

Further, according to the press method of the present embodiment, the gap between the screw shaft 19 and ram 27 can be easily eliminated using the movable member 40 and thus the bottom dead center position of the upper tool 29 can be stabilized. As a result, it is possible to reliably machine the workpiece W and thus to reduce the occurrence of defective products to improve production efficiency.

While, in the present embodiment, the lower portion of the screw shaft 19 is connected to the junction 26, other configurations may be employed. For example, a configuration may be employed in which the screw shaft 19 is rotatably held in such a manner that it does not move vertically and a lower portion of a vertically long nut 20 is connected to the junction 26. The nut 20 vertically moves along the screw shaft 19 by rotating the nut 20 or screw shaft 19. In this case, a high-torque, low-speed-rotation servo motor, for example, is used as the first drive source 22 for rotating the screw shaft 19, and a low-torque, high-speed-rotation servo motor, for example, is used as the second drive source 24 for rotating the nut 20. The nut 20 is rotatably held by the junction 26, and the movable member 40 contacts or retracts from the lower end of the nut 20. In embodiments described below also, the nut 20, instead of the screw shaft 19, may be connected to the junction 26.

Second Embodiment

Figure 7:
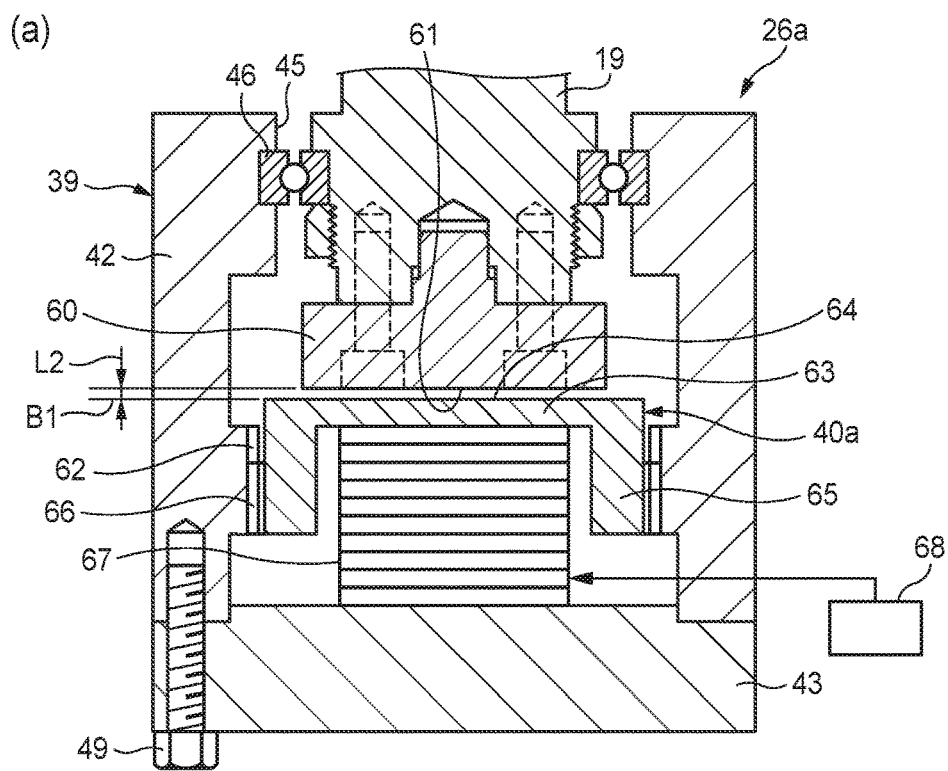
Figure 7:
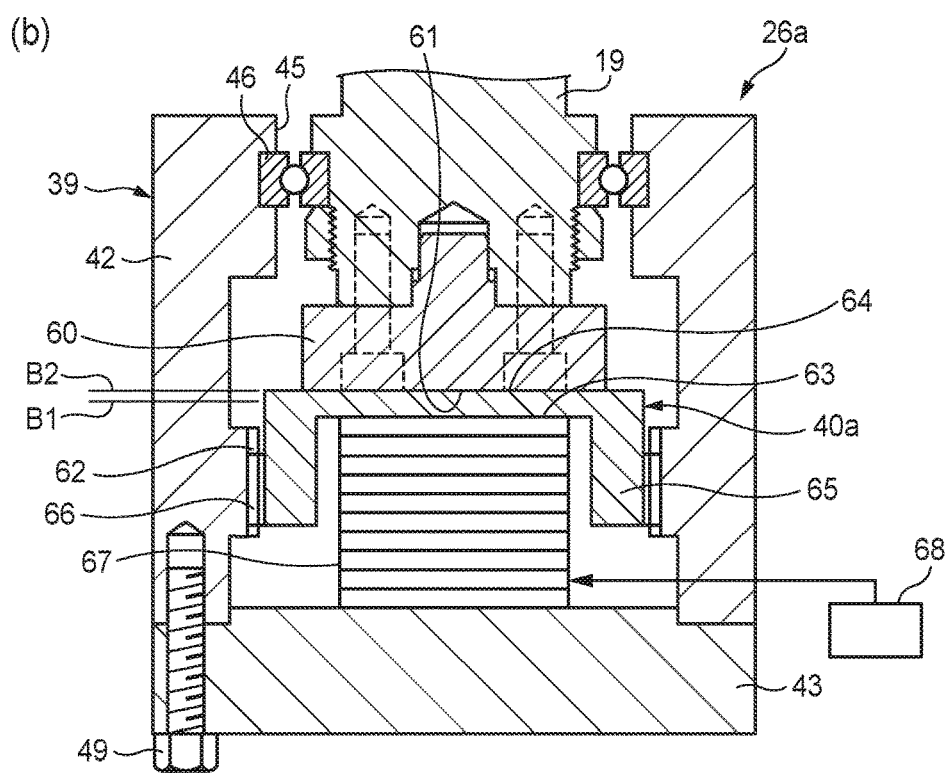

A second embodiment will be described with reference to FIG. 7. FIG. 7 includes diagrams showing a main part of a press machine according to the second embodiment, in which FIG. 7(*a*) is a sectional view during an approach (or during a return) and FIG. 7(*b*) is a sectional view during bending. FIG. 3 shows a junction 26*a*, and other elements are similar to those of the first embodiment shown in FIGS. 1 and 2. In the present embodiment, elements similar to those of the first embodiment are given the same reference signs, and description thereof will be omitted or simplified.

As shown in FIG. 7(*a*), in the junction 26*a*, a piezoelectric element 67 is used as a drive unit for moving a movable member 40*a*. As in the first embodiment, a contact member 60 is mounted on an end of a screw shaft 19. The lower surface of the contact member 60 is a flat surface 61. A tube 42 of a casing 39 has a vertical serration 62 on the inner circumference thereof. A cap-shaped member 63 is used as the movable member 40*a*, and the upper surface thereof is a flat surface 64 opposite to the flat surface 61 of the contact member 60. A tube 65 of the cap-shaped member 63 has a serration 66 connected to the serration 63 of the tube 42 on the outer circumference thereof. Thus, the rotation of the cap-shaped member 63 with respect to the tube 42 of the casing 39 is regulated, and the vertical movement thereof is allowed.

The cap-shaped member 63 and casing 39 need not necessarily be connected using the serrations 63 and 66, and any configuration may be employed in which the rotation of the cap-shaped member 63 is regulated and the vertical movement thereof is allowed. For example, a knurled structure or spline structure may be employed.

The piezoelectric element 67 is disposed between the cap-shaped member 63 and a bottom plate 43. The piezoelectric element 67 is, for example, a stacked piezoelectric element that is formed by stacking many sheet piezoelectric elements and uses a displacement in the thickness direction when a voltage is applied thereto. The number of stacked piezoelectric elements in the piezoelectric element 67 is determined in accordance with the amount of displacement of the cap-shaped member 63. The direction in which the piezoelectric element 67 is displaced is set to the same direction as the direction of the rotation axis of the screw shaft 19. The piezoelectric element 67 is connected to a drive circuit 68. As with the drive sources and drive unit, the drive circuit 68 is controlled by a controller (not shown).

As shown in FIG. 7(a), when the piezoelectric element 67 is nonoperating (when the voltage is not being applied thereto), the flat surface 64 of the cap-shaped member 63 is located at B1, and a gap L2 is formed between the flat surface 64 and the flat surface 61 of the contact member 60. Accordingly, during an approach, in which an upper tool 29 is lowered to a predetermined position, a first drive source 22 is driven without regulating the rotation of the screw shaft 19 (see FIG. 3). Thus, the screw shaft 19 is rotated at high speed, so that the upper tool 29 is lowered at high speed.

On the other hand, when the drive circuit 68 applies a voltage to the piezoelectric element 67, the piezoelectric element 67 extends upward. Thus, as shown in FIG. 7(b), the cap-shaped member 63 is raised to a position B2. As a result, the gap L2 is eliminated, and the flat surface 64 of the cap-shaped member 63 is strongly pressed against the flat surface 61 of the contact member 60. Thus, a friction occurs between both, so that the rotation of the screw shaft 19 is regulated. By driving a second drive source 24 in this state, a nut 20 is rotated (see FIG. 3). Thus, the screw shaft 19 is lowered while the co-rotation thereof is prevented. Bending or the like can be performed on the workpiece W. Since the gap between the screw shaft 19 and a ram 27 is eliminated as in the first embodiment, the bottom dead center position of the upper tool 29 does not vary. When the drive circuit 68 stops the application of the voltage, the piezoelectric element 67 shrinks, and the cap-shaped member 63 retracts from the contact member 60 and returns to the original position, B1.

As seen above, according to the second embodiment, the piezoelectric element 67 disposed between the casing 39 and movable member 40 is used as the drive unit of the movable member 40a. Thus, the movable member 40a can be electrically easily moved by the drive circuit 68. Further, the use of the piezoelectric element 67 allows the movement of the movable member 40a to be controlled using an easy method, such as the application a voltage or stop thereof. A press method of the second embodiment is approximately similar to the press method described with reference to FIG. 6.

While the flat surface 61 of the contact member 60 and the flat surface 64 of the cap-shaped member 63 contact each other in FIG. 7, other configurations may be employed. For example, as in the first embodiment, the inclined surfaces may contact each other. Further, one or both of the flat surfaces 61 and 64 may be mirror-finished or roughened. Further, the drive circuit 68 may be formed in the casing 39, or may be formed in a body frame 11 of the press machine 10 by wire or wirelessly.

Third Embodiment

Figure 8:
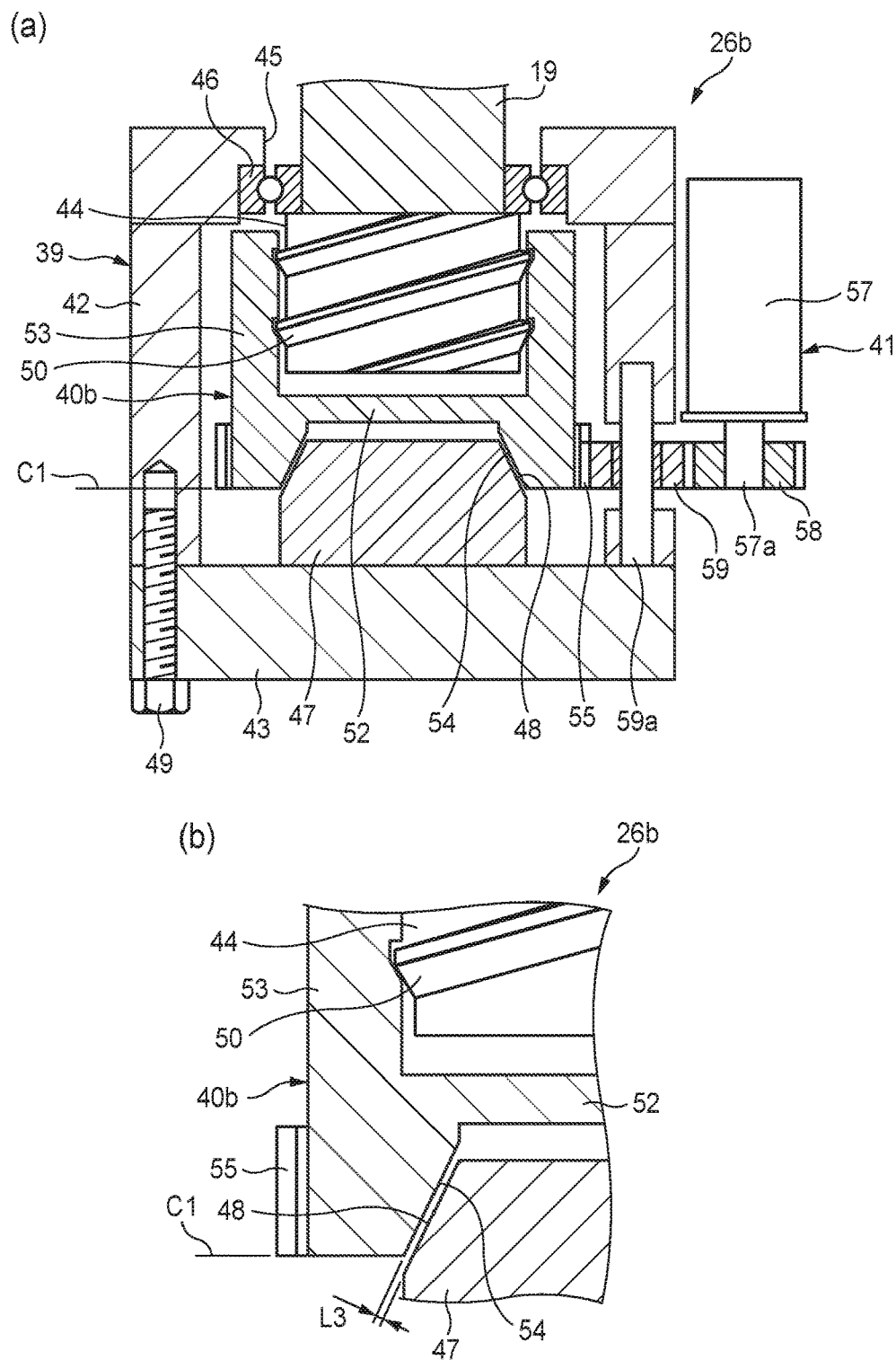
Figure 9:
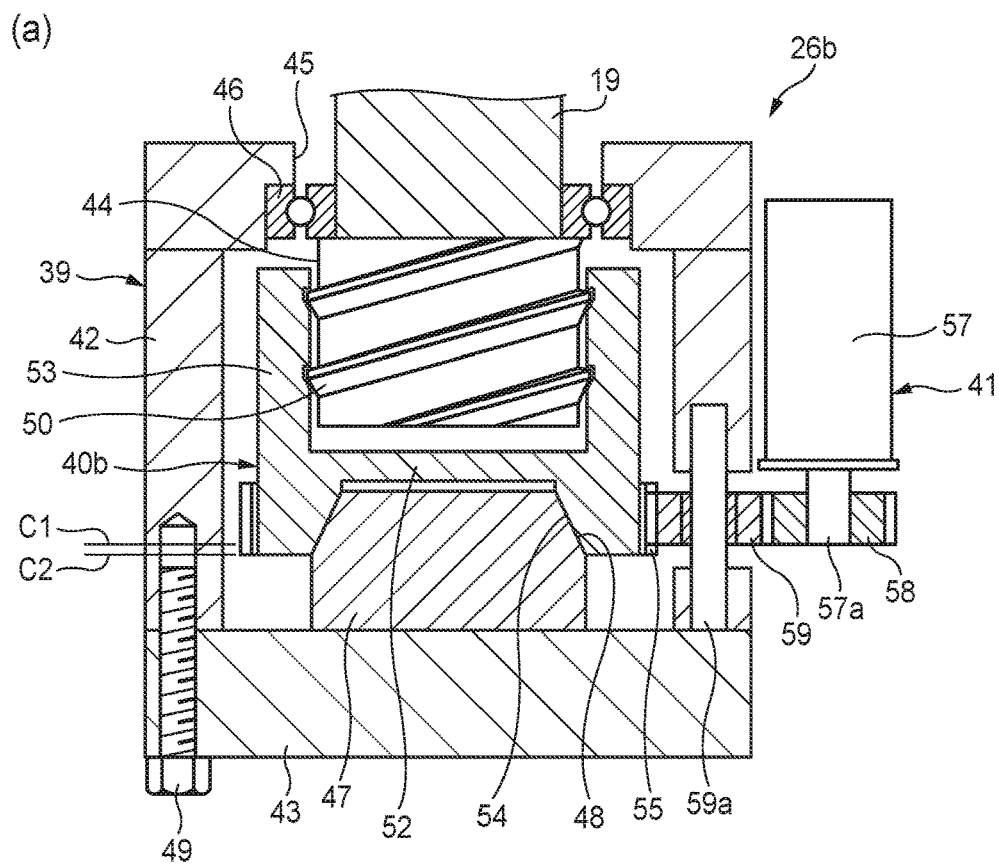
Figure 9:
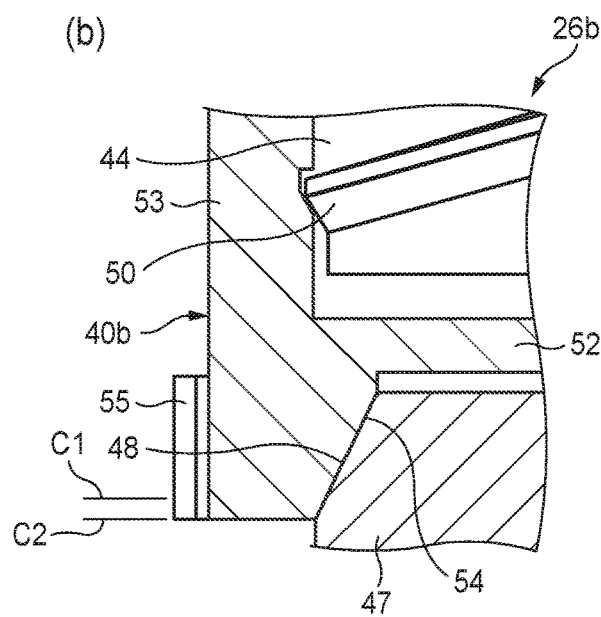

A third embodiment will be described with reference to FIGS. 8 and 9. FIG. 8 includes diagrams showing a main part of a press machine according to the third embodiment, in which FIG. 8(a) is a sectional view during an approach (or during a return) and FIG. 8(b) is an enlarged view of inclined surfaces and vicinities thereof. FIG. 9 includes diagrams showing a main part of the press machine, in which FIG. 9(a) is a sectional view during bending and FIG. 9(b) is an enlarged view of the inclined surfaces and vicinities thereof. FIGS. 8 and 9 show a junction 26b, and other elements are similar to those of the first embodiment shown in FIGS. 1 and 2. In the present embodiment, elements similar to those of the above embodiments are given the same reference signs and description thereof will be omitted or simplified.

As shown in FIG. 8(a), in the junction 26b, a contact member 47 and a slide screw 44 are disposed in positions opposite to those in the junction 26 of the first embodiment. The slide screw 44 is fixed to the lower end of a screw shaft 19, for example, using a bolt. As in the first embodiment, the screw shaft 19 is supported by a ball bearing 46 so as to be rotatable with respect to a casing 39, as well as so as not to vertically move with respect to the casing 39. The contact member 47 is fixed to a bottom plate 43 of the casing 39, for example, using a bolt.

The slide screw 44 is screwed into a slide screw nut 53 serving as a movable member 40b. Thus, an inclined surface 54 of the slide screw nut 53 is disposed so as to be opposite to an inclined surface 48 of the contact member 47. When the slide screw nut 53 is rotated, it moves vertically with respect to the casing 39. As shown in FIG. 8(a), a gear 55 is formed on the perimeter of the slide screw nut 53 so as to match the position of an intermediate gear 59 of a drive unit 41. To accommodate the vertical movement of the slide screw nut 53, the gear 55 may be formed so as to be vertically longer than in the first embodiment.

In the junction 26b, as in the first embodiment, by driving the drive unit 41, the slide screw nut 53 is rotated and thus the inclined surface 54 contacts or retracts from the inclined surface 48 of the contact member 47. As shown in FIG. 8, when the lower end of the slide screw nut 53 is located at a position C1, a gap L3 is formed between the inclined surfaces 48 and 54. By rotating the first drive source 22 (see FIG. 3), the screw shaft 19 can be rotated at high speed.

At this time, by driving the drive unit 41, the slide screw nut 53 may be rotated in the same direction so as to be in synchronization with the rotation of the screw shaft 19. When the screw shaft 19 is rotated, the slide screw 44 is also rotated. However, by preventing the rotation relative to the slide screw nut 53, inadvertent vertical movement of the slide screw nut 53 can be prevented. The drive of the drive unit 41 is controlled by a controller (not shown) so as to be in synchronization with the drive of the first drive source 22.

As shown in FIG. 9(a), by driving the drive unit 41, the slide screw nut 53 is rotated and lowered to a position C2. Thus, the inclined surface 54 contacts the inclined surface 48 of the contact member 47. At this time, the inclined surface 54 is strongly pressed against the inclined surface 48, producing a wedge effect. Thus, the slide screw nut 53 is held by the contact member 47, so that the rotation thereof is regulated. Similarly, the threads of the slide screw nut 53 and slide screw 44 are strongly pressed against each other, producing a wedge effect. Thus, the rotation of the slide screw 44 is regulated. As a result, the rotation of the screw shaft 19 is regulated.

By driving the second drive source 24 in this state and thus rotating the nut 20 (see FIG. 3), the screw shaft 19 is lowered while the co-rotation thereof is prevented. As a result, bending or the like can be performed on the workpiece W. Further, as in the first embodiment, the gap between the screw shaft 19 and a ram 27 is eliminated and thus the bottom dead center position of the upper tool 29 does not vary.

At this time, as shown in FIG. 8(b), the movable member 40 of a relay portion 26 is located at a lower position B2. Thus, the inclined surface 54 is wedge-connected to the inclined surface 48 of the adapter member 47. As a result, the movable member 40 is in contact with the adapter member 47. However, the position of the movable member 40 is ensured without causing a shift or wobble in the axis direction of the screw shaft 19, since a slide screw nut 56 is engaged with a slide screw 50 in a tube 42 of the casing 39. Thus, the screw shaft 19 is lowered without co-rotating in conjunction with the rotation of the nut 20.

As seen above, according to the third embodiment, as in the first embodiment, the co-rotation of the screw shaft 19 is reliably prevented by moving the movable member 40a. Further, the gap between the screw shaft 19 and ram 27 is eliminated so that a variation in the bottom dead center position of the upper tool 29 can be prevented. A press method of the third embodiment is approximately similar to the press method described with reference to FIG. 6.

While the embodiments have been described, the present invention is not limited thereto. Various changes can be made to the embodiments without departing from the spirit and scope of the present invention. For example, while, in the first and second embodiments, the contact members 47 and 60 are mounted on the end of the screw shaft 19, other configurations may be employed. A configuration may be employed in which the contact member 47 or 60 is not mounted. In this case, the movable members 40 and 40a contact the end of the screw shaft 19. Thus, the gap is eliminated, and the co-rotation of the screw shaft 19 is prevented.

While, in the press machines 10 of the embodiments, the structure 30 including the upper tool 28, ram 27, and upper tool 29 moves vertically, other configurations may be employed. For example, there may be employed a configuration in which as with the upper tool 29, the lower tool 12 also moves vertically, or a configuration in which the upper tool 29 is fixed and the lower tool 12 moves vertically.

In a configuration in which the lower tool 12 moves, the lower tool 12, the table 13 holding the lower tool 12, and the like form a structure, and this structure is vertically moved by the drive mechanism 17. Further, the junction 26 or the like described above is formed between the drive mechanism 17 and table 13. Accordingly, as in the embodiments, the rotation of the screw shaft 19 is prevented or allowed by driving the drive unit 41 and thus moving the movable member 40 and the like.

DESCRIPTION OF REFERENCE SIGNS

W . . . workpiece
10 . . . press machine
12 . . . lower tool
17 . . . drive mechanism
19 . . . screw shaft
20 . . . nut
22 . . . first drive source
24 . . . second drive source
26, 26a, 26b . . . junction
27 . . . ram
28 . . . upper tool holder
29 . . . upper tool
30 . . . structure
39 . . . casing
40, 40a, 40b . . . movable member
41 . . . drive unit
44 . . . slide screw
48, 54 . . . inclined surface
53 . . . slide screw nut
67 . . . piezoelectric element

The invention claimed is:

1. A press machine comprising a drive mechanism configured to move at least one of an upper tool and a lower tool, the press machine aiming to machine a workpiece placed between the upper tool and the lower tool, wherein
the drive mechanism uses a screw shaft or a nut connected to the screw shaft as an advance-retract component and comprises:
a first drive source configured to rotate the screw shaft; and
a second drive source configured to rotate the nut,
a structure comprising the upper tool or the lower tool comprises:
a casing supporting the screw shaft or the nut in such a manner that the screw shaft or the nut is rotatable;
a movable member movably formed in the casing and configured to be capable of contacting an end of the screw shaft or an end of the nut or retracting therefrom; and a drive unit configured to move the movable member.

2. The press machine of claim 1, wherein
the end of the screw shaft or the end of the nut has an inclined surface inclined with respect to an advance-retract direction, and
the movable member has an inclined surface that can contact the inclined surface.

3. The press machine of claim 1 or 2, wherein
a slide screw nut formed in the casing and connected to a slide screw is used as the movable member, and
when the slide screw nut is rotated by the drive unit, the slide screw nut contacts the end of the screw shaft or the end of the nut or retracts therefrom.

4. The press machine of claim 3, wherein
the slide screw is formed along a shaft core of the screw shaft in the casing, and
when the slide screw nut is rotated, the slide screw nut moves in the same direction as the advance-retract direction of the screw shaft or the nut.

5. The press machine of claim 1, wherein
a piezoelectric element disposed between the casing and the movable member is used as the drive unit, and
when the piezoelectric element shrinks, the movable member contacts the end of the screw shaft or the end of the nut or retracts therefrom.

6. The press machine of claim 1, wherein
a structure comprising the upper tool comprises:
an upper tool holder holding the upper tool; and a ram on which the upper tool holder is mounted, and
the casing is formed on an upper portion of the ram and connects the screw shaft or the nut and the ram.

7. A press method comprising a drive mechanism configured to move at least one of an upper tool and a lower tool, the press method aiming to machine a workpiece placed between the upper tool and the lower tool, wherein
the drive mechanism uses a screw shaft or a nut connected to the screw shaft as an advance-retract component and comprises:
a first drive source configured to rotate the screw shaft; and
a second drive source configured to rotate the nut,
a structure comprising the upper tool or the lower tool comprises:
a casing supporting the screw shaft or the nut in such a manner that the screw shaft or the nut is rotatable;
a movable member movably formed in the casing and configured to be capable of contacting an end of the screw shaft or an end of the nut or retracting therefrom; and a drive unit configured to move the movable member, the press method comprising:

rotating, by the first drive source or the second drive source, the screw shaft or the nut with the movable member retracted from the end of the screw shaft or the end of the nut to move at least one of the upper tool or the lower tool;
subsequently causing, by the drive unit, the movable member to contact the end of the screw shaft or the end of the nut; and
subsequently rotating, by the second drive source or the first drive source, the nut or the screw shaft to machine the workpiece.

* * * * *